Aug. 26, 1941.   J. F. HALDEMAN   2,253,516
AERATING AND FILTERING DEVICE FOR AQUARIUMS
Filed Aug. 11, 1938
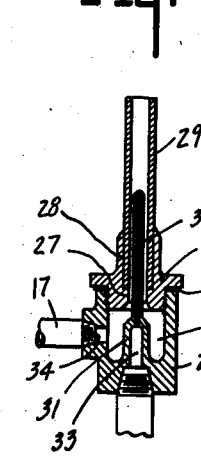
INVENTOR.
JAMES F. HALDEMAN.
BY Lockwood, Goldsmith & Galt,
ATTORNEYS.

Patented Aug. 26, 1941

2,253,516

UNITED STATES PATENT OFFICE 2,253,516

AERATING AND FILTERING DEVICE FOR AQUARIUMS

James F. Haldeman, Martinsville, Ind.

Application August 11, 1938, Serial No. 224,281

5 Claims. (Cl. 119—5)

This invention relates to an aquarium arrangement and means associated therewith for aerating and filtering the aquarium water which is cycled for that purpose.

The chief object of this invention is to produce an arrangement of the character indicated and which may have one or more of the following features included therein:

One is the discharge to the aquarium tank of aerated filtered water in such a manner that splashing is prevented.

A second feature is the mixing of air and water in an arrangement of this general character in such a manner that the mixing is devoid of splashing.

A third feature in an aquarium type unit, is mounting the power, pump and other associated means so that the power and pump vibrations are absorbed to a considerable degree if not entirely eliminated, so that the aforesaid vibrations are not transmitted to the aquarium tank and its contents.

A fourth feature of the invention consists in the inclusion of a filtering structure wherein the filtering medium can be cleaned by compression and washing without removal of the medium.

A fifth feature of the invention consists in providing such a filter structure as last mentioned, with washing fluid operable means so that the washing fluid supplies the power for the medium compression.

A sixth feature of the invention consists in embodying in a filter structure, as set forth in the fourth feature herein, a control arrangement whereby the filtering medium is alternately compressed and washed and such cycling is automatic.

A seventh feature of the invention consists in providing a control arrangement whereby the embodiment of the invention disclosed herein readily may be shifted from normal aquarium content aerating and filtering cycling to filtering medium compression and washing cycling.

Another feature of the invention consists in the positive aeration of filtered aquarium water, the aeration in amount being sufficient to at least fully saturate the water and generally provide an excess of oxygen thereto so that the water previous to its return to the aquarium supply has absorbed the full amount of oxygen possible.

Other objects and features of the invention will be set forth more fully hereinafter, such as the non-splashing venting of excess air carried by the water after being positively aerated.

The full nature of the invention will be understood from the accompanying drawing and the following description and claims.

In the drawing

Fig. 1 is a front view of an aquarium structure embodying one form of the invention, the aquarium structure being shown more or less skeletonized and devoid of ornamental characteristics.

Fig. 2 is an enlarged, central, sectional view of the filter structure with the washing and compressing apparatus incorporated therein.

Fig. 3 is an enlarged, central, sectional view of a positive aeration means.

Fig. 4 is an enlarged transverse, sectional view of the aquarium tank and the aerated water discharge thereto, and the means for preventing splashing and the relief of excess air without splashing.

Fig. 5 is an enlarged side elevational view of a lock element.

In the drawing 10 indicates a pair of spaced standards and the like and 11 the forward cross member intermediate the top and bottom of said standards. The numeral 12 indicates a parallel structure near the base of the standards, and for clearance purposes, it is spaced slightly above the lower ends 10a of the standards. The numeral 13 indicates a tank structure generally and 13a the front face thereof which preferably is of glass for exposing fish in the tank. The tank is of open top character and is suitably supported by the cross members 11 and the uprights or standards 10.

Nested within the frame work and suitably supported thereby, is an air supply tube 14 having the intake end 14a above the level 15 of the water in the aquarium tank 13. The lower end is exposed as at 14b and a flexible connection 16 connects said lower end to the pipe 17.

The motor 18 is suitably coupled as at 19 to a pump 20, the latter being supplied at the intake portion 21 by a line 22. The discharge from the pump 20 is into a fixture 23 shown most clearly in Fig. 3. This fixture includes a chamber 24 closed by a plug 25 sealed as at 26. The plug is apertured as at 27 and this bore is enlarged as at 28 to receive a tube 29 which connects to a line 30, as shown in Fig. 1.

The central portion of the member 23 includes a bored extension 31 that extends into the chamber 24 and terminates in an elongated tube 32, the opening therethrough communicating with the bore portion 33 of the portion 31 and in free communication with the pump discharge. The air supply conduit 17 communicates with the chamber 24 as at 34. Water under pressure discharged by the pump passes through the bore 33 and the tube 32 and thence into the tube 29 and into the conduit 30. In so doing it creates a suction in the tube 29 and more especially in the chamber 24 so that air is drawn into said chamber and is intimately mixed in tube 29 with the pressure discharged water in the tube 29 and the volume of air is at least sufficient to fully saturate with oxygen the water being cycled from and to the tank 13. The tank 13 at or near its bottom is provided with a discharge 35 which is flexibly connected as at 35a to a conduit 36 in turn connected to the pump supply conduit 22, as hereinafter set forth.

Suitably supported by the frame work or the like, is a discharge conduit 37 and the same is flexibly connected as at 38 to the conduit 30. Herein conduit 37 is shown provided at its upper end with a substantially horizontal discharge portion 39, seen most clearly in Figs. 1 and 4. This discharge conduit is preferably, but not necessarily, positioned adjacent the back wall of the tank and may be suitably supported thereby or by the end walls of the tank, as desired.

This tube includes a plurality of downwardly directed apertures 40 and these open into the tank below the normal water level therein, indicated by the numeral 15. In other words, normally conduit 39 is partially submerged.

The back wall 13b of the tank includes a forward extension at its upper edge, indicated by the numeral 41, and the same extends over the conduit 39 and beyond the same and forwardly thereof is continued downwardly, forming a baffle or apron 42. This partially masks the discharge conduit 39. It preferably terminates, at its lower end 42a, above the water level 15 of the tank. Along the upper surface of the conduit 39 there is provided a smaller series of ports 43; the purpose thereof is as follows:

In this cycling of the water, the injector structure shown in Fig. 3 is operative to fully charge the water with oxygen and generally there is an excess of oxygen supplied to the water over and above that which can be normally absorbed thereby. This excess oxygen when the aerated water reaches the conduit 39, collects near the upper part of the conduit and the oxygenated water discharges without splashing into the tank 13 below the level 15 thereof. The excess oxygen and some of the water that may be mechanically discharged therewith, are discharged through the openings 43 and thus air pocketing or air locking is prevented. Such surplus air as may discharge through the ports 40 will rise to the surface of the water in the tank and thus escape without splashing. The air and the water which escape through the ports 43 discharge upwardly and outwardly into the auxiliary overhead chamber formed by the back wall of the tank, the forward extension 41 at the upper edge thereof and the depending baffle portion 42.

The water which may be so discharged is prevented from escape from the tank for it discharges upon the back wall, the overhead portion and the forward portion or the inner walls of this auxiliary chamber, and thence discharges to the tank proper without splashing. The air discharged into this auxiliary chamber escapes by passing under the lower edge 42a of the forward baffle 42. Thus, the water is returned to the tank, fully aerated and without any splashing, permitting an aquarium of this character to be utilized in situations wherein surface aeration such as heretofore employed in this industry, would be objectionable to employ because of splashing.

In the present embodiment of the invention, there is disclosed a filter structure, designated generally in Fig. 1 by the letter F. It also is suitably supported as hereinafter pointed out. The tank discharge 35 or more especially the conduit 36, communicates with the conduit 44 which enters the filter as at 45. The water leaves the filter as at 46 and discharges to conduit 46a in turn communicating with conduit 22. This completes the water cycle when the filter structure is included in the aerating arrangement cycle.

To prevent vibration incident to the operation of the device being transmitted to the tank and its contents, etc., there is provided a plurality of supports 47 which are herein illustrated as of substantially channel shape and the same extend across the device and the lower portions are suitably secured as at 48 to the two lower cross members 12 of the frame structure. The upper portions of said channel members 47 suitably support the upper ends of the plurality of tension springs 49, the lower ends of which are secured to a platform 50. The motor 18 is suitably secured as at 51 to said platform. The pump 20 is suitably secured as at 52 to said platform and the filter structure F is suitably secured to an auxiliary frame work in the form of smaller channels 53, as at 54, and the auxiliary frame work in turn is secured as at 55 to the platform 50.

Inasmuch as lines 14b and 17, 30 and 37, and discharge 35 and conduit 36 are flexibly connected together by members 16, 38 and 35a, respectively, vibration of the several elements, to-wit, the motor, the pump and the filter, the latter vibration, if any, being of secondary character, is prevented from being transmitted to the frame and/or tank. Within the filter F there is provided suitable medium in the form of sponge material 82, and the like.

The present embodiment of the invention includes a pressure supply line 56 and the waste line 57. These are flexibly connected or otherwise connected as desired at 58 and 59, respectively, to the conduits 60 and 61. Conduit 60 discharges to the filter structure F at 62. The waste line 61 connects to the filter structure as at 63. With this addition it is quite apparent that when water under pressure is supplied from line 56 to the filter F, the water may wash the filter medium 82 and the wash water may waste from the filter to be discharged through line 57.

In order not to have operative interference, suitable valve means is provided to control the aerating filtering cycling supply and the washing and wasting supply. Individual valves may be provided but preferably valve means having a common operative control are provided and by way of example only, said valve means herein is illustrated as of a multiple valve structure. It includes a valve housing 64 having a chamber 65 therein adapted to receive a valve member 66. Said chamber is closed as at 67 and through said member 67 extends the valve stem 68 which mounts a handle 69. The stem 68 is rigid with the multiple valve member 66 which includes the several ports or passages of diametrical character, 71, 72, 73 and 74.

When the valve handle 69 is in the position as illustrated in Fig. 1, the conduit 36 does not communicate with the conduit 44 and the conduit 22 does not communicate with the conduit 46a and, therefore, the cycling of the aerated filtered water does not occur. When the valve handle is thus positioned, water pressure is supplied by line 56 to the intake 62 of the filter structure F by line 62a and this water is then discharged from the filter discharge 63 by way of line 63a to the line 61.

The motor 18 is supplied with power by means of current supply lines 75 controlled by the switch 76. Preferably in the present embodiment of the invention, the switch 76 is opened when the unitary valve structure is conditioned as shown in Fig. 1. When the handle is moved 90° towards the observer the conduit 36 communicates with conduit 44 and conduit 22 communicates with conduit 46a and conduit 63a does not communicate with conduit 61 and conduit 60 does not communicate with conduit 62a.

When the valve handle is in this position, the switch 76 can be closed so that the aeration and filtering cycle will be in effect. In other words, the mechanism herein disclosed is adapted to alternately clean the filter and effect the cycling of the aerated filtered water and as previously set forth, if that is required, to effect the same, the handle 69 is moved from the position shown in Fig. 1 to a position at right angles thereto and thereafter return it to the position shown in Fig. 1.

Reference will be had now more particularly to Fig. 2. The filter structure F includes a chamber 77 and communicating therewith is the waste outlet 63 and the tank waste intake 45. These are provided in the upper portion and the waste outlet is of greater area than the inlet. The lower portion of the chamber 77 includes the discharge 46 which leads to the pump 20. The chamber 77 also includes a port 78.

Suitably suspended and in spaced relation to the cover 77a forming the chamber 77 of the filter structure F is a perforated screen or plate 80. This is of sheet metal and has considerable strength, the necessity for which will appear hereinafter. Normally positioned near the bottom of the chamber 77 is a corresponding plate 81 similarly formed, the plates being apertured as at 80a and 81a, respectively. The plate 81 is capable of movement toward and away from plate 80 for alternately compressing and releasing the filtering medium 82 in the chamber 77 and included between the plates.

Depending from the chamber 77 is a chamber structure 83 including the intake or water pressure line supply connection 62. Mounted within the chamber 83 is a cylinder 85 having a relatively open lower end 86 which, however, is threaded to receive a polygonally apertured retainer 87, the latter being externally threaded. A disc 88 includes one or more smaller apertures 89, the latter registering with the aperture 87a of the retaining member 87. Member 88 serves as a check valve upon a release operation. Member 87 serves as the valve seat. The periphery of the member 88 may be of serrated character, as indicated at 88a. Water under pressure in chamber 84 thus can freely enter through the port 87a and elevate the member 88, and the water can then pass upwardly into the cylinder 85 through the serrated portion 88a of the plate 88 and through the aperture 89, thus subjecting the interior of the cylinder 85 to pressure. A stop member 90 may be provided to limit the upward movement of the flap valve 88.

Mounted within the cylinder 85 is a piston structure 91 carried by a stem 92 which extends through the opening 93a in the cylinder head 93. The piston rod 92 is suitably secured to the movable plate 81 as at 94 and a spacing collar 95 prevents plate 81 from assuming a position lower than that illustrated in Fig. 2. Interposed between the cylinder head 93 and the piston 91 is a coil spring 96. This normally tends to hold the plate 81 in its lowermost position. When the cylinder is subjected to pressure, the piston is caused to move upwardly and at the same time carries with it the plate 81 thereby compressing filtering medium 82 (sponge material). In this movement, it will be apparent the spring 96, as it is compressed, has stored in it power for returning plate 81 and the piston to the position shown in Fig. 1 and that this occurs upon the release of pressure from chamber 84. When this pressure in chamber 84 is released, the power medium included within the cylinder between the piston and the valve 88 is gradually discharged through the port 89 only and not through the serrated portions 88a because the member 88 during this operation is seated on the member 87 and thus seals the cylinder except as described. This arrangement, therefore, constitutes a retarding or dash pot construction and by employing a spring of a definite force and providing an aperture 89 of a definite size, the exact or desired return or release interval can be obtained.

Mounted in the chamber 84 is a valve 96 which is adapted to seal the port 78 in order to hold the pressure supplied by the intake 62 within the chamber 84 to effect piston movement. It will be obvious, of course, that in place of the piston construction a diaphragm may be employed in lieu thereof and like results obtained.

Within chamber 84 is mounted a plate 97 provided with an ear 98 which pivotally supports at 99 an actuating arm 100 that carries at one end the valve 96. Extending through the bottom of the chamber 77 and the plate 97 is a rod 101. This rod has a head portion 102 in chamber 84 that bears upon the lever 100. In the chamber 77 the rod 101 has the head portion 103 adapted to be engaged when the plate has reached its lowermost position. Herein the same is engaged by the head 104 on a stem or rod 105 suitably secured as at 106 to the plate 81 and extending through the plate 97 and the bottom of the chamber 77 as at 107. This rod 105 at its lower end adjustably mounts as at 108 an angular arm 109 which constitutes a tripping member. Slidably mounted on the rod is a bearing member 110 which is provided with a shoulder 111 against which bears one end of the concentric spring 112, the opposite end bearing on the trip member anchorage 108.

The lever 100 is apertured as at 113 and the rod 105 extends freely therethrough. Adjacent the aperture 113 the bearing member 110 bears on said member 100 after the rod 105 has been sufficiently elevated. Normally there is slight clearance between the member 100 and the member 110 when the parts are in the position shown in Fig. 2. As the rod 105 is elevated with the plate 81 due to water pressure in chamber 84, the spring 112 is compressed and more and more force is exerted thereby through the member 110 on to the arm 100. Inasmuch as the member 101 has limited sliding movement, it no longer is effective to hold the actuating arm 100 in valve closing position so that if other means were not provided, the valve actuating arm would be thus actuated to open the valve 96 and permit the relief of pressure in chamber 84 to exhaust into the chamber 77 and waste therefrom as at 63, this being the washing operation. The additional means, however, for holding this lever in valve closing position until the predetermined plate movement has occurred is a tiltable latch designated by the numeral 120. It is pivotally supported at 121 on an ear 122 carried by the plate 97—see Figs. 2 and 5.

A spring 123 has one end concentric with an extension 124 of the member 120. The opposite end of the spring may be located by the portion 125 on the plate 97. Thus the spring normally constrains the member 120 so that the portion 126 of member 120 normally is interposed between the plate 97 and the free end of the valve actuating lever 100. Thus as long as this latch remains in the position shown in Fig. 2 and pressure is supplied to intake 62, valve 96 will be held closed despite the effort of the slidable member 110 to open the same and the plate 81 will continue to be elevated by means of the pressure power arrangement previously described. Inasmuch as the tripping member 109 is simultaneously elevated with the piston 91 and the plate 81, until the upper end 109a engages the surface 127 of the tail portion 128 of the member 120, the valve 96 will remain closed.

When this engagement does occur, any additional movement in the same direction causes the member 120 to be tilted on its pivot 121 in opposition to the spring 123 and thereupon the portion 126 is caused to move from between the supporting plate 97 and the valve operating member 100. Upon that release operation occurring, the member 110, all the while bearing on the lever arm 100, immediately becomes effective, through the power stored in the spring 112, to tilt this valve actuating arm 100 to open the valve 96 and permit the pressure in the chamber 84 to vent through the port 78 into the chamber 77 for washing purposes.

It will be apparent that following the compression of the sponge or filtering medium 82, within the chamber 77 and included between the apertured plates 80—81, there will be included in chamber 77 a mass of dirty water and this water initially is caused to be discharged through the outlet 63 to the waste 57 and then the clean water replaces the same. Following the release of this valve holding member 129 and the initial venting of the chamber 84, the piston and the plate 81 are caused to return toward the position shown in Fig. 2 by means of the power spring 96. The rate of return is regulated by the dash pot arrangement, as set forth.

As long as the rod 105 is lowering in the return movement of the plate, the spring 112 will be extending and thus the bearing on the valve actuated arm 100 will be retained in order to hold the valve 96 open until just immediately prior to the parts attaining the lowermost position. At that time the member 110 loses contact with the valve operating arm 100.

To insure positive closing of the valve 96 at this period or slightly thereafter, the portion 104 of the rod 105 engages the head 103 of the rod 101 and rod 101 is caused to move downwardly and in so doing tilts the lever arm 100 in the opposite direction to insure closing or seating of the valve 96 and in this closing movement, the free end of the valve operating arm 100 engages the portion 126 of the catch member 120 and by means of spring 123 the catch member is repositioned between the plate 97 and the free end of the operating arm 100 so that it will hold the valve operating arm in valve closing position until the predetermined compressing action has been attained.

It will be quite obvious that as long as the valve 69 is maintained in the position as shown in Fig. 1, pressure will be alternately supplied to the cylinder 85 and released therefrom for sponge compression purposes. Then the pressure water will be alternately supplied to and cut off from the chamber 77 for washing purposes. Following a sufficient interval of filter cleaning, the same in the present disclosure, including both compressing and washing, the valve handle 69 is moved into a position at right angles to that shown herein and as previously described, the compressing and washing operations are discontinued, the motor is energized and the cycling of the tank contents is initiated and this is continued until it is determined the tank water is not in proper condition whereupon the valve handle 69 is again actuated and the cleaning of the filter is again effected.

To guard against the attendant forgetting to stop the filter cleaning operation and reestablish the aerating and filtering cycle, and to automatically provide "make up" for loss by evaporation, and to insure some relatively free water supply to the tank during filter cleaning, the following is provided.

Leading from pressure supply line 62a (normally without pressure during aerating and filtering) is a small conduit 130 connected to tank supply line 37 and including a flexible connection 131. This conduit may include a check valve if desired although the same is not illustrated herein for clearness.

An overflow line 132 from the tank 13 includes a flexible connection 133 and communicates with waste line 61 although for positive control it may communicate with line 63a ahead of the main valve and thus be controlled thereby.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In an aquarium system and the like, including a water pressure system with a pressure supply and a waste therefor, the combination of a unitary arrangement for connection therebetween including an aquarium connected to the supply and waste, a pump, a filter structure, means connecting the aquarium, filter and pump in a closed cycle, and means operatively associated with the filter structure and interposed in the pressure system ahead of the waste for filter washing.

2. In combination, a vessel such as an aquarium and the like, including a body of water, a filter structure which communicates with the vessel and through which filter structure the water from the vessel passes by gravity or suction, pump means connected at its intake end to the filter and discharging to the vessel the water withdrawn through the filter, relatively enclosed positive aeration means including a chamber open to the atmosphere and operable by the water discharged into said chamber for subsequent discharge to the vessel for positively aerating the previously filtered water, an auxiliary chamber in the vessel near the water level thereof, and discharge means supplied with aerated and filtered water by said pump means and positioned beneath the auxiliary chamber and discharging below the water level and said auxiliary chamber.

3. In an aquarium tank and the like, the combination with a pump and a positive aerator connected together and to the tank, the pump intake therefrom being below the aerator discharge thereto, of an auxiliary chamber in said tank protectively venting to the atmosphere, and discharging means in said chamber and venting upwardly into the auxiliary chamber substantially as and for the purpose described.

4. In combination, an aquarium tank, a pump, a filter, all arranged in closed cycle relationship, valve means upon each side of the filter and in said cycle relationship, a source of water pressure, a waste, connections between the source and filter and filter and waste, valve means in said connections, a connection from the source of pressure to the tank for tank supply independent of pump supply, and an overflow from the tank to said waste.

5. A combination as defined by claim 4, characterized by said valve means being simultaneously and oppositely operable.

JAMES F. HALDEMAN.